(12) United States Patent
Kanada

(10) Patent No.: US 10,949,662 B2
(45) Date of Patent: Mar. 16, 2021

(54) IMAGE PROCESSING APPARATUS

(71) Applicant: SEIKO EPSON CORPORATION, Tokyo (JP)

(72) Inventor: Kentaro Kanada, Ina (JP)

(73) Assignee: Seiko Epson Corporation, Tokyo (JP)

(*) Notice: Subject to any disclaimer, the term of this patent is extended or adjusted under 35 U.S.C. 154(b) by 132 days.

(21) Appl. No.: 16/230,199

(22) Filed: Dec. 21, 2018

(65) Prior Publication Data
US 2019/0197305 A1 Jun. 27, 2019

(30) Foreign Application Priority Data

Dec. 27, 2017 (JP) .............................. JP2017-250716
Jul. 4, 2018 (JP) .............................. JP2018-127402

(51) Int. Cl.
G06K 9/00 (2006.01)
G06K 9/68 (2006.01)
G06K 9/34 (2006.01)
G06F 16/16 (2019.01)
G06T 7/00 (2017.01)

(52) U.S. Cl.
CPC ......... G06K 9/00456 (2013.01); G06F 16/16 (2019.01); G06K 9/00469 (2013.01); G06K 9/344 (2013.01); G06K 9/6878 (2013.01); G06T 7/0002 (2013.01); G06K 2209/01 (2013.01); G06T 2207/10004 (2013.01); G06T 2207/30176 (2013.01)

(58) Field of Classification Search
None
See application file for complete search history.

(56) References Cited

U.S. PATENT DOCUMENTS

2006/0062459 A1* 3/2006 Saito .................... G06K 9/6835
382/181
2017/0099403 A1* 4/2017 Honda ................. H04N 1/2166

FOREIGN PATENT DOCUMENTS

JP 2009-164721 A 7/2009

* cited by examiner

Primary Examiner — Wei Wen Yang
(74) Attorney, Agent, or Firm — Chip Law Group

(57) ABSTRACT

There is provided an image processing apparatus including a processor that acquires document image data generated by reading the document and recognizes a character string included in the document image data by character recognition and a storage that saves the document image data, in which the processor compares a folder name of an existing folder in the storage with the character string included in the document image data to select a folder in which at least a part of the folder name matches the character string included in the document image data, as a folder of a save destination of the document image data.

8 Claims, 7 Drawing Sheets

IMAGE PROCESSING APPARATUS

BACKGROUND

1. Technical Field

The present invention relates to an image processing apparatus and a non-transitory computer-readable computer medium storing an image processing program for processing document image data generated by reading a document.

2. Related Art

When document image data generated by scanning a document with a scanner is saved as a file, a user assigns a file name and saves the file in a folder. A folder is also called a directory or the like. In addition, an image processing apparatus is disclosed (JP-A-2009-164721), in which a reading unit reads the image of a set document, at the same time, a second reading unit reads the image of a set business card, and a main control unit acquires identification information such as a company name and a name from the image of the business card, assigns a file name including the acquired identification information to the file of the document image, automatically selects an individual folder named the same company name as the acquired company name, and saves the file in the selected folder.

When saving the document image data as a file, the user needs to set the folder of the save destination, but it is a burden for the user to select an appropriate folder as a save destination from a large number of existing folders. However, in JP-A-2009-164721, since the apparatus needs to read not only the document which is the object of saving the image but also the business card, the burden of the user is heavy, and in a case where two reading units are not mounted on the apparatus or there is no business card, the apparatus does not work.

SUMMARY

An advantage of some aspects of the invention is to provide an image processing apparatus and an image processing program which make it easy to appropriately set a folder as a save destination of a file.

According to an aspect of the invention, an image processing apparatus includes a control unit that acquires document image data generated by reading a document and recognizes a character string included in the document image data by character recognition and a storage unit that stores the document image data, in which the control unit compares a folder name of an existing folder in the storage unit with the character string included in the document image data to select a folder in which at least a part of the folder name matches the character string included in the document image data, as a folder of a save destination of the document image data.

According to the configuration, the image processing apparatus presents the user with a folder in which at least a part of the folder name among the existing folders in the storage unit matches the character string included in the document image data. Therefore, the user can save the document image data in an appropriate folder merely by setting the presented folder (displayed on the display unit) as the save destination of the document image data.

In the apparatus, the control unit may set a folder name of a folder at the same level as a folder as a save destination of previous data, as a comparison target with the character string included in the document image data.

According to the configuration, the image processing apparatus can efficiently detect an appropriate folder as a save destination of the document image data and present the folder to the user by limiting the folder whose folder name is compared with the character string included in the document image data to the range of the folders at the same level as the folder where previous data was saved. The control unit may further include a folder name of a folder one level higher than the folder as the save destination of the previous data or a folder name of a folder one level lower than the folder, as a comparison target with the character string included in the document image data.

In the apparatus, the control unit may preferentially select a folder in which at least a part of the folder name matches the character string included in the document image data and a plurality of character strings included in a path indicating a route to a folder in the storage unit match the character string included in the document image data, as the folder of the save destination.

According to the configuration, the image processing apparatus can present a suitable folder as a save destination of document image data in a manner that the user can more easily set by comparing not only the folder name but also the character string constructing the path with the character string included in the document image data.

According to another aspect of the invention, an image processing apparatus includes a control unit that acquires document image data generated by reading a document and recognizes a character string included in the document image data by character recognition and a storage unit that saves the document image data, in which the control unit compares a file name of a file saved in a storage unit with the character string included in the document image data to select the file name, at least a part of which matches the character string included in the document image data, as a file name of the document image data.

According to the configuration, the image processing apparatus presents the user with a file name, at least a part which matches the character string included in the document image data among the file names of the files saved in the storage unit. Therefore, the user can save the document image data with an appropriate file name merely by making minimal edits on the presented file name (displayed on the display unit).

The technical idea of the invention may also be realized by a category other than an image processing apparatus category.

According to still another aspect of the invention, an image processing program causes a computer to execute a control function of recognizing a character string included in the document image data by character recognition on document image data generated by reading a document, in which the control function compares a folder name of an existing folder in a storage unit with the character string included in the document image data to select a folder in which at least a part of the folder name matches the character string included in the document image data, as a folder of a save destination of the document image data.

In addition, it is possible to grasp the image processing program including the control function of comparing a file name of a file saved in the storage unit with a character string included in the document image data and selecting the file name, at least a part of which matches a character string included in the document image data, as a file name of the document image data, as an invention.

In addition, an invention of a method corresponding to processing by each program and a computer-readable storage medium storing each program are also invented as an invention.

BRIEF DESCRIPTION OF THE DRAWINGS

The invention will be described with reference to the accompanying drawings, wherein like numbers reference like elements.

DESCRIPTION OF EXEMPLARY EMBODIMENTS

Hereinafter, embodiments of the invention will be described with reference to drawings. Each drawing is merely an example for describing the present embodiment. In addition, since each drawing is an example, drawings may not be consistent with each other.

1. SCHEMATIC DESCRIPTION OF APPARATUS CONFIGURATION

Figure 1:
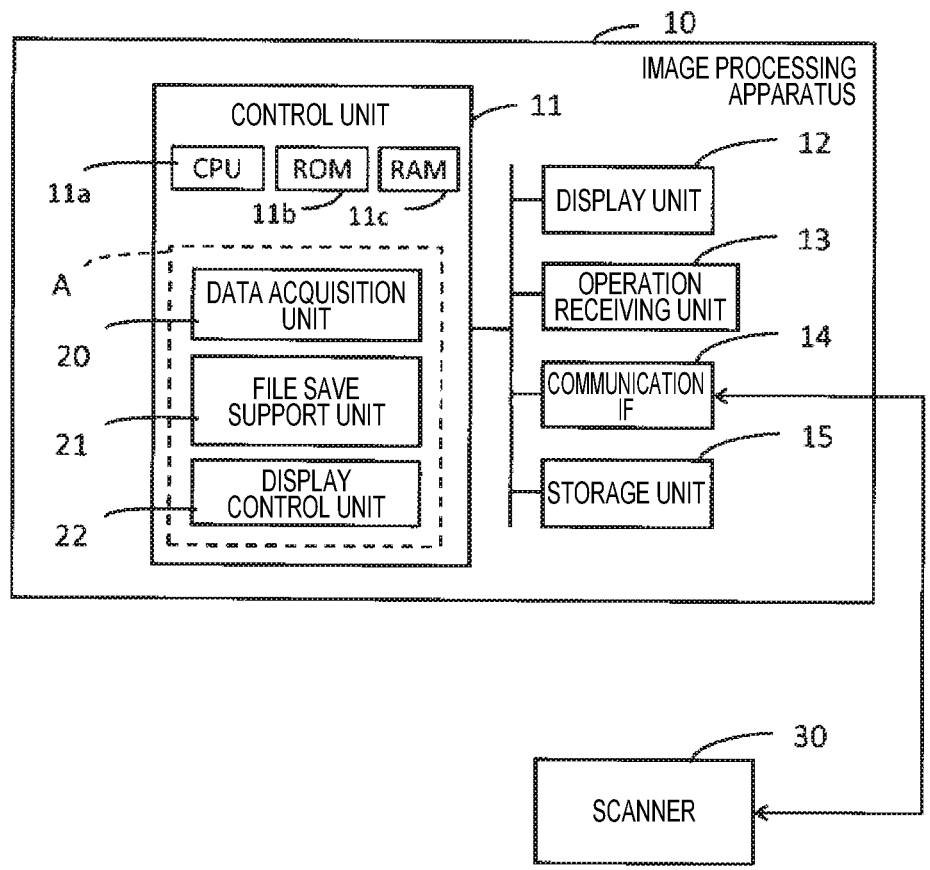
FIG. 1 is a diagram showing a configuration of an image processing apparatus in a simplified manner.

FIG. 1 simply shows a configuration of an image processing apparatus 10 according to the embodiment. The image processing apparatus 10 communicably connects with a reading apparatus (scanner 30) that optically reads a document, generates image data of a predetermined format as a reading result, and outputs the image data to the outside. The scanner 30 may be any device that functions as a scanner including known products.

The image processing apparatus 10 is realized by, for example, a personal computer (PC), a smartphone, a tablet type terminal, a cellular phone, or an information processing apparatus having processing capability equivalent to those. In addition, hardware capable of realizing a control unit 11 according to the embodiment may be called an image processing apparatus.

The image processing apparatus 10 includes, for example, a control unit 11, a display unit 12, an operation receiving unit 13, a communication interface (IF) 14, a storage unit 15, and the like. The control unit 11 is configured to appropriately include one or a plurality of ICs having a processor (for example, a CPU 11a, an ASIC, or an ASIC and a CPU, and the like may cooperate with each other), a ROM 11b, a RAM 11c, and the like, or other memory and the like. The storage unit 15 is, for example, a non-volatile storage device such as a hard disk drive (HDD) or a flash memory. The storage unit 15 may be a part of the control unit 11.

In the control unit 11, the processor (CPU 11a) controls the behavior of the image processing apparatus 10 by executing arithmetic processing according to a program saved in the ROM 11b, the storage unit 15, and the like, using the RAM 11c and the like as a work area. The control unit 11 has a program A as one of the programs and realizes each function such as a data acquisition unit 20, a file save support unit 21, a display control unit 22, and the like according to the program A. The program A is an image processing program causing a computer to execute processing on document image data generated by reading a document. In addition, the program A is an application for executing saving and management of document image data.

The communication IF 14 is an IF that executes communication with the outside in a wired or wireless manner according to a predetermined communication protocol including a known communication standard. In the example of FIG. 1, the image processing apparatus 10 is connected to the scanner 30 via the communication IF 14. Of course, the image processing apparatus 10 may be connected to an external network via the communication IF 14 or another communication IF (not shown), and the control unit 11 (program A) may also upload document image data acquired from the scanner 30 to, for example, an external server (not shown) via the network (local area network, Internet communication network, and the like).

The display unit 12 is means for displaying visual information and consists of, for example, a liquid crystal display (LCD), an organic EL display, or the like. The display unit 12 may include a display and a drive circuit for driving the display. The operation receiving unit 13 is means for receiving an operation by a user and is realized by, for example, a physical button, a touch panel, a mouse, a keyboard, or the like. Of course, the touch panel may be realized as one function of the display unit 12. In addition, the display unit 12 and the operation receiving unit 13 may collectively be referred to as an operation panel or the like.

A part of configuration shown in FIG. 1, such as the display unit 12, the operation receiving unit 13, the storage unit 15, or the like, may be peripheral devices externally attached to the image processing apparatus 10. In addition, a system including the image processing apparatus 10 and the scanner 30 shown in FIG. 1 may be regarded as one invention. Alternatively, the image processing apparatus 10 and the scanner 30 may be entirely included in one apparatus as a matter of fact. In a case where the image processing apparatus 10 and the scanner 30 are included in one apparatus, such a configuration (one apparatus) may be referred to as a reading apparatus or the like. In addition, the configuration (one apparatus) including the image processing apparatus 10 and the scanner 30 may be a multifunctional apparatus having a plurality of functions as a printer (copier), a facsimile, or the like.

2. FILE SAVE PROCESSING

Figure 2:
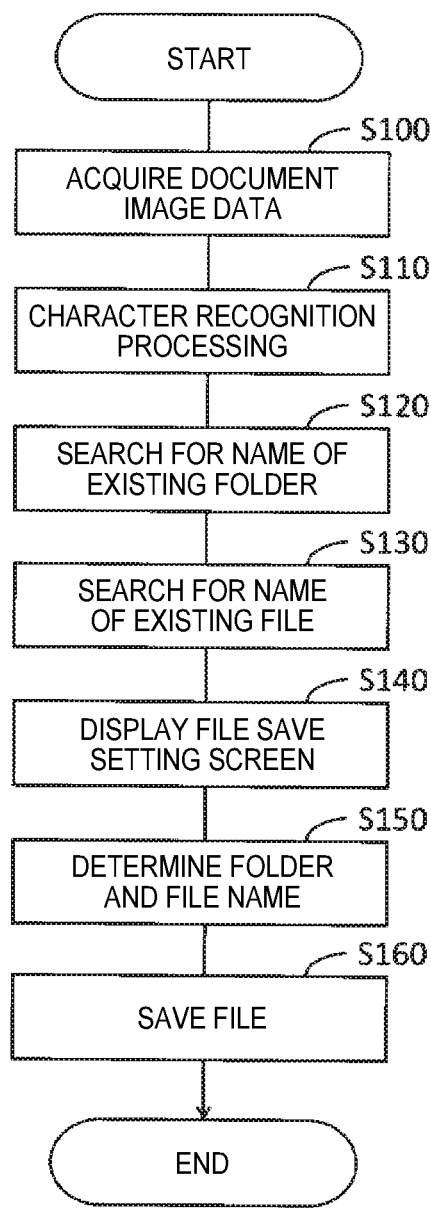
FIG. 2 is a flowchart showing file saving processing.

FIG. 2 is a flowchart showing file save processing executed by the control unit 11 according to the program A. First, the scanner 30 generates image data by reading a document arbitrarily set by the user. In the embodiment, it is assumed that the document that the user reads by the scanner 30 is a document in which at least characters are described. The document is, for example, a receipt, a bill or a contract. The scanner 30 transmits the image data (document image data) as the reading result of the document to the image processing apparatus 10. The control unit 11 instructs the scanner 30 to start reading the document via the communication IF 14, and the scanner 30 may start reading the document in accordance with the instruction to start the reading from the control unit 11.

The control unit 11 (data acquisition unit 20) acquires the document image data transmitted from the scanner 30 as described above via the communication IF14 (step S100). Instead of directly acquiring (receiving) the document image data from the scanner 30, the data acquisition unit 20 may acquire the document image data from the storage unit (for example, the storage unit 15) as a transfer destination to which the document image data is transferred from the scanner 30.

The control unit 11 (file save support unit 21) recognizes a character string included in the document image data by performing character recognition (OCR: Optical Character Recognition/Reader) on the document image data acquired in step S100 (step S110). In this case, the character string and the recognizable objects included in the document image data are converted into character data (text data). Since the character recognition processing is a well-known technique, further description will be omitted.

In step S120, the file save support unit 21 searches for the folder name of an existing folder in the storage unit 15 from the character string (hereafter, character strings in data) included in the document image data recognized in step S110. For example, assume that a folder named "XYZ" exists in the storage unit 15 as one of the existing folders. In this case, if the character string "XYZ" is compared with the character strings in the data and the character string "XYZ" is included in the character strings in the data, that is, if the character string "XYZ" is successfully found from the character strings in the data, the file save support unit 21 detects the existing folder of the folder name "XYZ" as one of save destination candidate folders.

It is also assumed that the folder name is a combination (combined) of a plurality of words having different meanings such as words meaning the type of a saved document, words meaning a customer name, year and month, and the like. Therefore, in step S120, not only in a case where a character string matching the folder name of the existing folder is included in the character strings in the data but also in a case where a character string matching a part of the folder name of the existing folder is included in the character strings in the data, the file save support unit 21 determines that the folder name of the existing folder has been successfully found from the character strings in the data and detects the existing folder of the folder name as one of save destination candidate folders.

However, the part of the folder name of the existing folder means a part composed of a certain number of characters. In a case where a certain number of characters are used for the folder name of the existing folder. For example, one character is included in the character strings in the data, this is because a large number of existing folders that are not appropriate as save destinations are regarded as save destination candidate folders if it is determined that the folder names of the existing folders are successfully found from the character strings in the data. In step S120, for example, the file save support unit 21 treats a character group composed of two or more consecutive characters in the folder name or each word in a folder name in which a plurality of words are combined by a hyphen "-", an underscore "_", or the like as a minimum unit of "a part of a folder name".

In step S120, the file save support unit 21 may search for the folder names of all the existing folders in the storage unit 15 from the character strings in the data, but it is more efficient to limit the folder name to search for to some extent.

In addition, it may be said that there is a high possibility that the user saves new data in a folder in which data was saved in the past or a folder in the vicinity thereof. Therefore, the file save support unit 21 may set a folder name of a folder at the same level as the folder as the save destination of previous data, as a comparison target with the character strings in the data.

Figure 3:
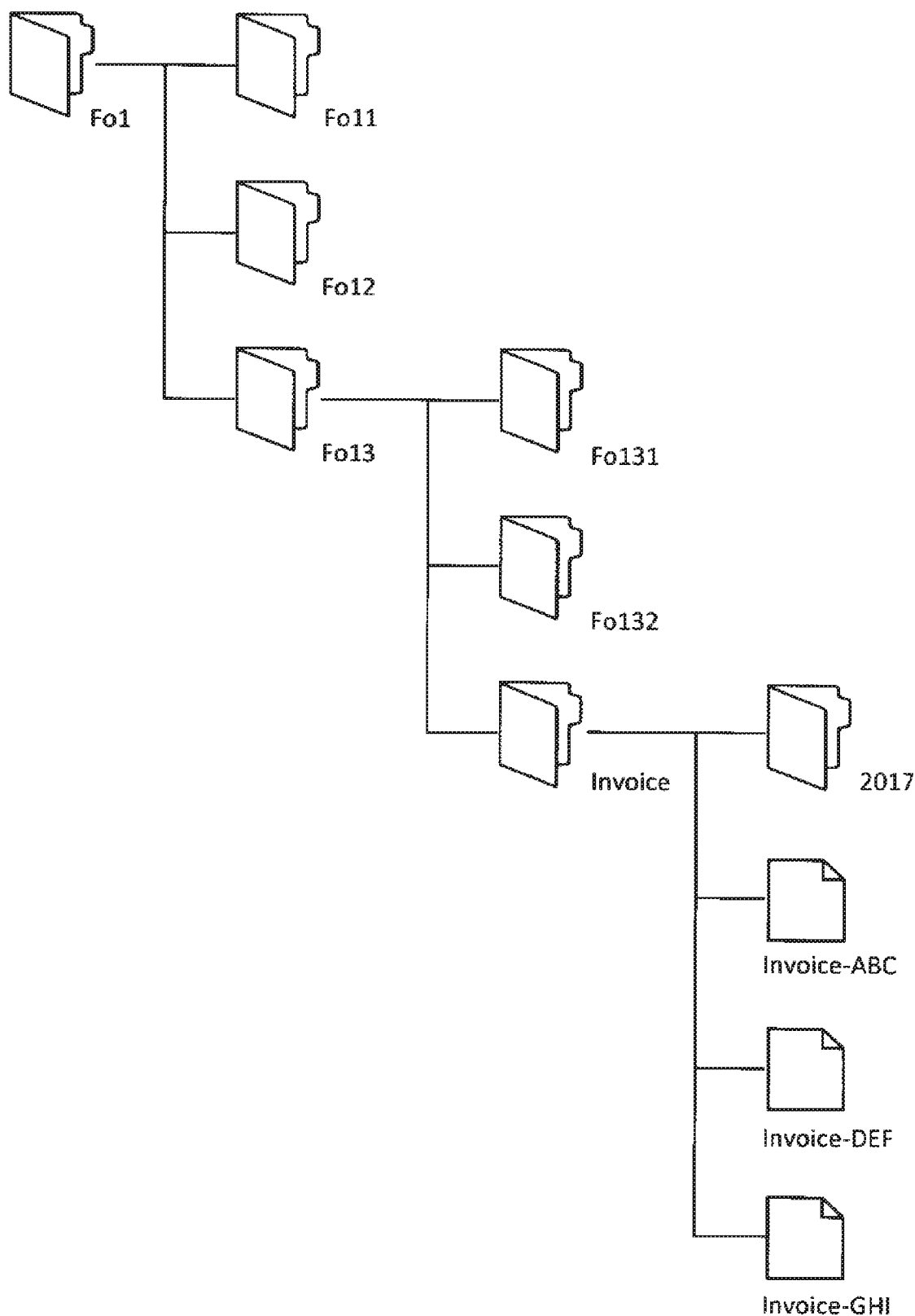
FIG. 3 is a diagram showing an example of a hierarchical structure of folders.

FIG. 3 shows an example of a hierarchical structure of folders in the storage unit 15. In FIG. 3, examples of names of folders and files are shown near icons of corresponding folders and files. In the range shown in FIG. 3, a folder "Fo1" is in the highest hierarchy, and a folder "Fo11", a folder "Fo12", and a folder "Fo13" are provided one level lower than the folder "Fo1" in the folder "Fo1". In addition, a folder "Fo131", a folder "Fo132", and a folder "Invoice" are provided one level lower than the folder "Fo13" in the folder "Fo13". Further, a folder "2017" is provided in the folder "Invoice", and a file "Invoice-ABC", a file "Invoice-DEF", and a file "Invoice-GHI" are saved. FIG. 3 is only a part of the hierarchical structure of folders in the storage unit 15, and the storage unit 15 may further include folders and files (not shown).

Here, at a present time (step S120), it is assumed that the data saved last time (in the latest past) by the control unit 11 executing the program A is the file "Invoice-GHI". The file "Invoice-GHI" is saved in the folder "Invoice". Therefore, the file save support unit 21 searches for the folder name "Invoice" and the folder names ("Invoice", "Fo131", and "Fo132") of other folders "Fo131" and "Fo132" at the same level as the folder "Invoice" from the character strings in the data, respectively.

Further, the file save support unit 21 may set the folder name of the folder one level higher than the folder as the save destination of the previous data or the folder name of the folder one level lower than the folder of the previous data, as a comparison target with the character strings in the data. As in the example above, it is assumed that the previously saved data is the file "Invoice-GHI". In this case, the file save support unit 21 may search for the folder names ("Invoice", "Fo131", "Fo132", "Fo11", "Fo12", "Fo13", "2017") of the folders "Fo11", "Fo12", and "Fo13" one level higher than the folder "Invoice" and the folder name of the folder "2017" one level lower than folder "Invoice" in addition to the folder "Invoice" as the save destination of the file "Invoice-GHI" and the other folders "Fo131" and "Fo132" at the same level as the folder "Invoice" from the character strings in the data, respectively.

In step S130, the file save support unit 21 searches for a file name (excluding an extension such as ".pdf") of a file (existing file) saved in the storage unit 15 from the character strings in the data. Step S130 is processing in which the processing of step S120 is generally applied to a file name instead of a folder name. For example, as one of existing files, a file named "Invoice-ABC" is saved in the storage unit 15 (see FIG. 3). In this case, if the character string "Invoice-ABC" is compared with the character strings in the data and the character string "Invoice-ABC" is included in the character strings in the data, that is, if the character string "Invoice-ABC" is successfully found from the character strings in the data, the file save support unit 21 detects the file name "Invoice-ABC" as one of candidate file names.

In step S130, not only in a case where a character string matching the file name of the existing file is included in the character strings in the data but also in a case where a character string matching a part of the file name of the existing file is included in the character strings in the data, the file save support unit 21 determines that the file name of the existing file has been successfully found from the character strings in the data and detects the file name as one of the candidate file names. Also, in this case, the part of the file name of the existing file means a part composed of a certain number of characters. In step S130, for example, the file save support unit 21 treats a character group composed of two or more consecutive characters in the file name or each word in a file name in which a plurality of words are combined by a hyphen "-", an underscore "_", or the like as a minimum unit of "a part of a file name".

In step S130, the file save support unit 21 may search for the file names of all the existing files in the storage unit 15 from the character strings in the data, but it is more efficient to limit the file name to search for to some extent. Therefore, the file save support unit 21 may set a file name of a file saved in the folder as the save destination of the previous data, as a comparison target with the character strings in the data.

As in the example above, it is assumed that the previously saved data is the file "Invoice-GHI". The file "Invoice-GHI" is saved in the folder "Invoice". Therefore, the file save support unit 21 searches for the file names ("Invoice-ABC", "Invoice-DEF", and "Invoice-GHI") of the files "Invoice-ABC", "Invoice-DEF", and "Invoice-GHI" stored in the folder "Invoice" from the character strings in the data, respectively. Further, the file save support unit 21 may set the file names of existing files saved in each of the other folders at the same level, the folder one level higher, and the folder one level lower as comparison targets with the character strings in the data.

In FIG. 2, the search of the existing file name (step S130) is executed after the search of the existing folder name (step S120), but the processing order of these steps S120 and S130 may be reversed or may be performed in parallel depending on the processing capability of the control unit 11.

Figure 4:
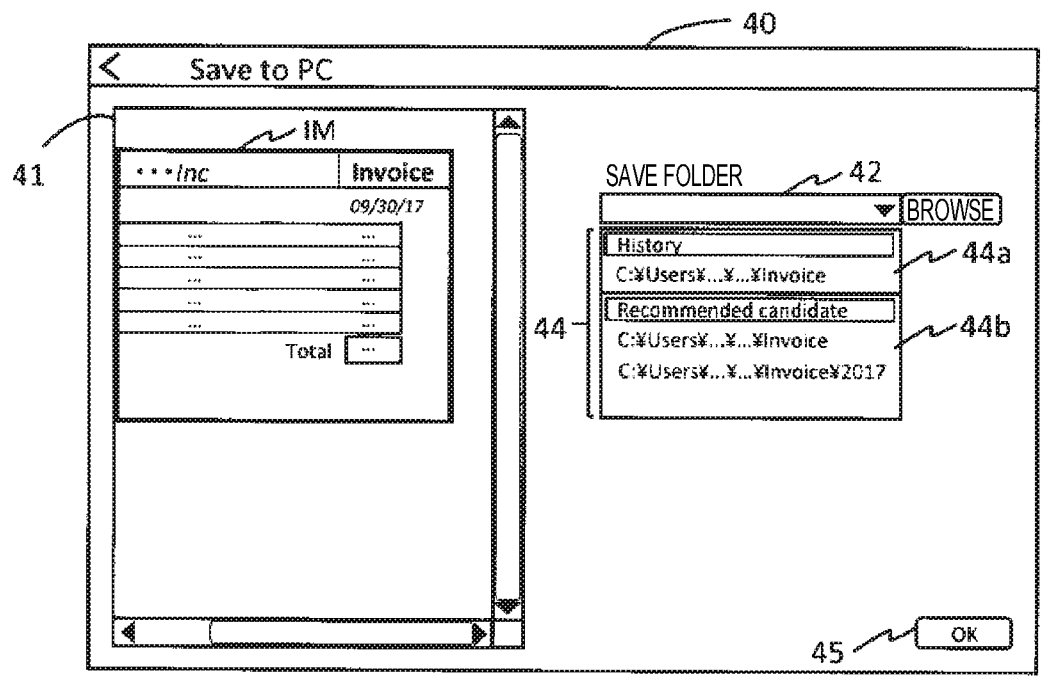
FIG. 4 is a diagram showing an example of a file save setting screen including a folder candidate field.
Figure 5:
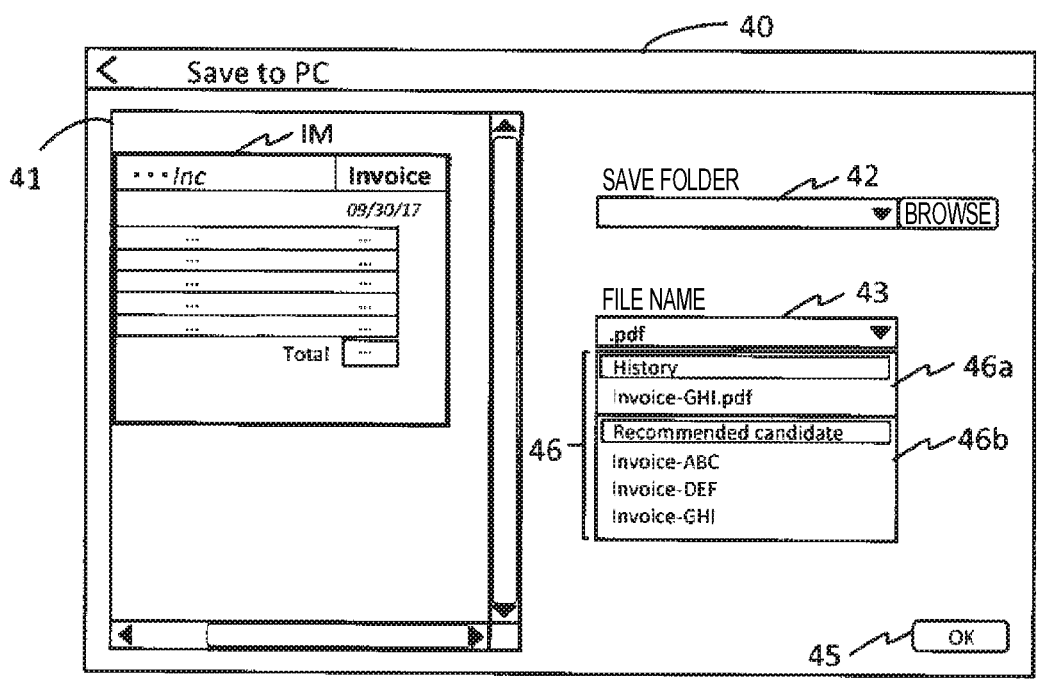
FIG. 5 is a diagram showing an example of a file save setting screen including a file name candidate field.

In step S140, the control unit 11 (display control unit 22) displays a file save setting screen based on the results of steps S120 and S130 on the display unit 12. FIGS. 4 and 5 illustrate a file save setting screen 40 to be displayed by the display control unit 22 on the display unit 12 in step S140, respectively. The file save setting screen 40 includes a document image display field 41, a folder setting field 42, a file name setting field 43, and the like. Naturally, the layout and design on the file save setting screen 40 are not limited to those shown. In FIG. 4, the file name setting field 43 is hidden in the field denoted by a reference numeral 44 and temporarily invisible. In the document image display field 41, an image IM based on the document image data acquired in step S100, that is, a document is displayed, and the user may visually recognize the document read by the scanner 30 through the document image display field 41.

The folder setting field 42 is an input field for setting a folder (for example, a folder in the storage unit 15) as a save destination of the document image data acquired in step S100. The user may set an arbitrary folder (an existing folder or a newly created folder) in the folder setting field 42 by operating the operation receiving unit 13 or the like. In addition, in response to a predetermined operation (for example, a display instruction of a pull-down menu) on the folder setting field 42 by the user, the display control unit 22 displays a folder candidate field 44 in the vicinity of the folder setting field 42, as illustrated in FIG. 4. The folder candidate field 44 includes a first field 44a for displaying a folder based on the history of file saving and a second field 44b for displaying the folder detected as the save destination candidate folder in step S120.

In the first field 44a, the folder (the path of the folder) of the save destination of the previously saved data is displayed. As is known, a path is a character string indicating a route to a folder in the storage unit. In the second field 44b, the path of the folder, such as the folder specified as the save destination candidate folder in step S120, for example, "C:\Users\ . . . \ . . . \Invoice", "C:\Users\ . . . \ . . . \Invoice\2017", or the like, is displayed. The display control unit 22 sets the folder selected from the folder candidate field 44 in the folder setting field 42. In other words, the user may set the selected folder in the folder setting field 42 merely by selecting a folder from the folder candidate field 44 (clicking or tapping the path of the folder displayed in the folder candidate field 44).

The file name setting field 43 is an input field for setting the file name at the time of saving the document image data acquired in step S100. The user may set an arbitrary file name in the file name setting field 43 by operating the operation receiving unit 13 or the like. In addition, in response to a predetermined operation (for example, a display instruction of a pull-down menu) on the file name setting field 43 by the user, the display control unit 22 displays a file name candidate field 46 in the vicinity of the file name setting field 43 as illustrated in FIG. 5. The file name candidate field 46 includes a first field 46a for displaying a file name based on the history of file saving and a second field 46b for displaying the file name detected as a candidate file name in step S130.

In the first field 46a, the file name attached to the previously saved data is displayed. In the second field 46b, file names such as "Invoice-ABC", "Invoice-DEF", "Invoice-GHI" and the like are displayed as candidate file names in step S130. The display control unit 22 sets the file name selected from the file name candidate field 46 in the file name setting field 43. In other words, the user may set the selected file name in the file name setting field 43 merely by selecting the file name from the file name candidate field 46 (clicking or tapping the file name displayed in the file name candidate field 46). However, since the file names displayed in the file name candidate field 46 are all the file names of existing files, the file names are not basically used as the file names to be newly saved. Therefore, the user makes minimal editing on the file name selected from the file name candidate field 46 and set in the file name setting field 43 via the operation receiving unit 13.

In the above description, it is possible to read the mode in which the folder candidate field 44 (FIG. 4) and the file name candidate field 46 (FIG. 5) are displayed at different timings in the file save setting screen 40, but as the design of the file save setting screen 40, the folder candidate field 44 and the file name candidate field 46 may be displayed at the same time.

The control unit 11 determines the folder and the file name of the save destination according to the user's input on the file save setting screen 40 (step S150). More specifically, when detecting an operation to a predetermined button (OK button 45 in the example of FIGS. 4 and 5) on the file save setting screen 40, the control unit 11 determines the folder set in the folder setting field 42 at that point in time as the save destination of the document image data acquired in step S100 and determines the file name set in the file name setting field 43 at that point in time as the file name of the document image data acquired in step S100.

Then, the control unit 11 saves the document image data acquired in step S100 as a file with the file name determined in step S150 in the folder of the save destination determined in step S150 (step S160). In this case, the file is saved by the operation of the predetermined button (OK button 45) as a trigger. Step S150 and step S160 are executed substantially simultaneously. This completes the flowchart of FIG. 2.

Depending on the search result of the existing folder name in step S120, the save destination candidate folder may not be detected in some cases. In such a case, since a save destination candidate folder may not be displayed in step S140, the display control unit 22 displays the folder candidate field 44 not having the second field 44*b* when displaying the folder candidate field 44 in the file save setting screen 40. In addition, depending on the search result of the existing file name in step S130, the candidate file name may not be detected in some cases. In such a case, since a candidate file name may not be displayed in step S140, the display control unit 22 displays the file name candidate field 46 not having the second field 46*b* when displaying the file name candidate field 46 in the file save setting screen 40.

In the present specification, not only a mode of executing both the search of the existing folder name (step S120) and the search of the existing file name (step S130) but also a mode of executing only one of these steps S120 and S130 is part of the disclosure. In other words, the flowchart of FIG. 2 may not include step S130, or may not include step S120. In the embodiment in which step S130 is not executed, in step S140, the display control unit 22 displays the file name candidate field 46 not having the second field 46*b* when displaying the file name candidate field 46 in the file save setting screen 40. On the other hand, in the embodiment in which step S120 is not executed, in step S140, the display control unit 22 displays the folder candidate field 44 not having the second field 44*b* when displaying the folder candidate field 44 in the file save setting screen 40.

3. SUMMARY

As described above, according to the embodiment, the image processing apparatus 10 includes the control unit 11 that acquires document image data generated by reading a document (step S100) and recognizes a character string (character strings in data) included in the document image data by character recognition (step S110) and the storage unit 15 that stores the document image data. The control unit 11 compares the folder name of an existing folder with the character strings in the data in the storage unit 15 (step S120) and displays the existing folder in which at least a part of the folder name matches the character strings in the data as a folder of a save destination of the document image data (save destination candidate folder) on the display unit 12 (step S140).

That is, in the embodiment, if there is an existing folder of a folder name that matches (at least in part) the character string included in the character strings in the data of the document image data, under the idea that the existing folder is highly likely to be an appropriate folder as a save destination of the document image data, the save destination candidate folder as described above is presented to the user. Therefore, the user may set an appropriate folder as the save destination of the scan data (document image data) of the document read by the scanner 30 merely by viewing the save destination candidate folders in the folder candidate field 44 (second field 44*b*), and selecting and approving the folder (OK button 45).

According to the embodiment, the control unit 11 compares the file name of the existing file stored in the storage unit 15 with the character strings in the data (step S130) and displays the file name of the existing file, at least a part of which matches the character string included in the document image data on the display unit 12 as a file name (candidate file name) of the document image data (step S140).

That is, in the embodiment, if there is an existing file with a file name that (at least partly) matches the character string included in the character strings in the data of the document image data, the file name presents the candidate file name as described above to the user under the idea that there is a high possibility that the file name is likely to be similar to an appropriate file name for the document image data. Accordingly, the user may set an appropriate file name as the file name of the scan data (document image data) of the document scanned by the scanner 30 merely by viewing the candidate file names in the file name candidate field 46 (second field 46*b*), selecting a file name, making a minimal edit on the file name, and approving (pressing the OK button 45).

4. MODIFICATION EXAMPLE

The embodiment is not limited to the above-described embodiment, but may include various modification examples. Hereinafter, modification examples included in the embodiment will be described.

Modification Example 1

As a result of searching for the existing folder name in step S120, in a case where a plurality of save destination candidate folders are detected, the control unit 11 may determine the priority order when displaying the folders in step S140 based on the degree of coincidence between the plurality of character strings included in the paths of the save destination folders and the character strings in the data.

The modification example will be described with specific examples. It is assumed that the folders specified as the save destination candidate folders in step S120 are the existing folder (first existing folder) represented by the path "C:\Users\ . . . \JJJ\Invoice" and the existing folder (second existing folder) represented by the path "C:\Users\ . . . \KKK\Invoice". In other words, the folder names of both the first existing folder and the second existing folder are "Invoice".

For example, it is assumed that "JJJ" and "KKK" in the paths are company names or the like issuing a document which is an invoice, that is, a bill. In addition, it is assumed that the character string "JJJ" and "Invoice" are included in the character strings in the data of the document image data acquired in step S100, but the character string "KKK" is not included. In such a specific situation, in step S120, the first existing folder and the second existing folder whose folder names are "Invoice" are detected as save destination candidate folders.

In response to such a result of step S120, in step S140, the control unit 11 preferentially displays a folder that is a save destination candidate folder and in which a plurality of character strings included in the path matches the character strings in the data. In the comparison between the first existing folder and the second existing folder, in the first existing folder, the two character strings "JJJ" and "Invoice" among the character strings included in the path match the character strings in the data. On the other hand, in the second existing folder, only the character string "Invoice" among the character strings included in the path matches the character strings in the data. Therefore, the control unit 11 preferentially displays the first existing folder over the second existing folder. The preferential display is to display the folders in a manner that the user may more easily select a folder, for example, a display in a higher position in the list.

Figure 6:
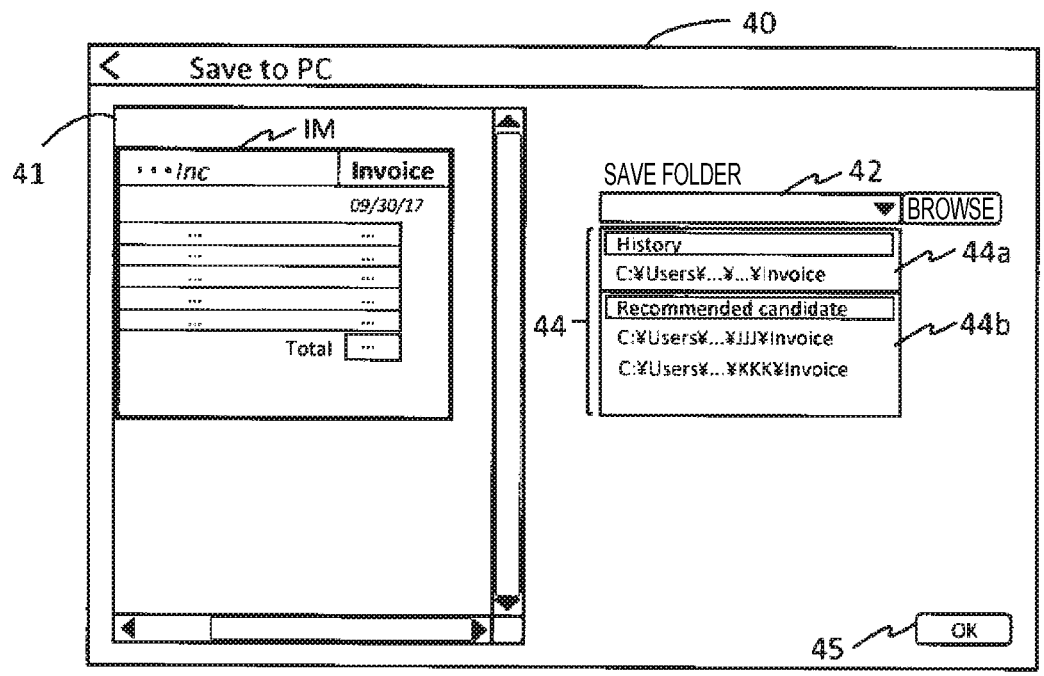
FIG. 6 is a diagram showing a file save setting screen including a folder candidate field according to a modification example.

FIG. 6 shows an example of the file save setting screen 40 to be displayed on the display unit 12 in step S140, which is different from FIG. 4. Also, in FIG. 6, as in FIG. 4, the folder candidate field 44 is displayed in the file save setting screen 40. In the example of FIG. 6, the first existing folder and the second existing folder are displayed in the second field 44b of the folder candidate field 44, and the first existing folder is displayed at a higher position in the list in the second field 44b than the second existing folder.

According to such a modification example, it may be said that the control unit 11 preferentially displays an existing folder in which at least a part of the folder name matches the character strings in the data and a plurality of character strings included in the path indicating the route to the folder in the storage unit 15 match the character strings in the data, on the display unit 12 as a folder of a save destination (save destination candidate folder). In other words, the control unit 11 may present a suitable folder as a save destination of document image data in a manner that the user may more easily set by comparing not only the folder name but also other character strings constructing the path with the character strings in the data.

Here, the existing folder (third existing folder) represented by the path "C:\Users\ . . . \Invoice\JJJ" and the existing folder (fourth existing folder) represented by the path "C:\Users\ . . . \Invoice\KKK" exist in the storage unit 15, and as described above, it is assumed that the character strings "JJJ" and "Invoice" are included in the data character string of the document image data acquired in step S100, the character string "KKK" is not included. In this case, in step S120, the third existing folder whose folder name is "JJJ" among the third existing folder and the fourth existing folder is detected as a save destination candidate folder.

The idea of such a modification example may also be applied to the display of a file name. In other words, the control unit 11 may preferentially display the file name, at least a part of which matches the character strings in the data and in which a plurality of character strings included in the path indicating the route to the file in the storage unit 15 match the character strings in the data as a file name (candidate file name) of the document image data on the display unit 12.

It is assumed that the file paths of three existing files "Invoice-ABC", "Invoice-DEF" and "Invoice-GHI" in the storage unit 15 are expressed as follows. "C:\Users\ . . . \ . . . \JJJ\Invoice-ABC" (first existing file) "C:\Users\ . . . \ . . . \KKK\Invoice-DEF" (second existing file) "C:\Users\ . . . \ . . . \KKK\Invoice-GHI" (third existing file)

As described above, it is assumed that the character string "JJJ" and "Invoice" are included in the character strings in the data of the document image data acquired in step S100, but the character string "KKK" is not included. In this case, in step S130, any of the first to third existing files "Invoice-ABC", "Invoice-DEF" and "Invoice-GHI" in which "Invoice" is included in the file names are detected as candidate file names. In response to such a result of step S130, in step S140, the control unit 11 most preferentially displays a file name in which a plurality of character strings included in the path matches the character strings in the data among the candidate file names, that is, the first existing file, in the second field 46b of the file name candidate field 46. As described above, the control unit 11 may perform display in such a manner that the user may more easily set an appropriate file name when saving the document image data by comparing not only the file name but also other character strings constructing the path with the character strings in the data.

Modification Example 2

As another modification example, the control unit 11 may present (newly create) a folder name including a character string representing the type of the read document as a candidate for a folder name for saving a file.

Figure 7:
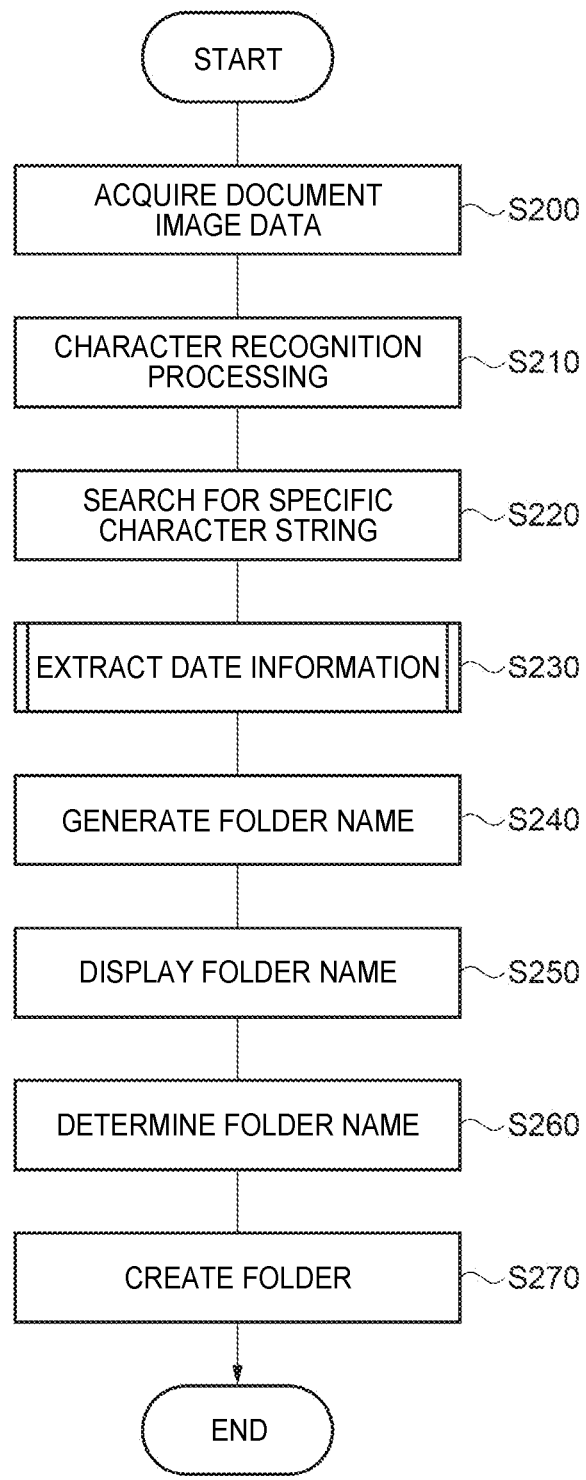
FIG. 7 is a flowchart showing folder name determination processing according to a modification example.

FIG. 7 shows processing of determining the folder name executed by the control unit 11 according to the program A by a flowchart. First, the scanner 30 generates image data by reading a document arbitrarily set by the user. In the embodiment, it is assumed that the document that the user reads by the scanner 30 is a document in which at least characters are described. The document is, for example, a receipt, a bill or a contract. The scanner 30 transmits the image data (document image data) as the reading result of the document to the image processing apparatus 10. The control unit 11 instructs the scanner 30 to start reading the document via the communication IF14, and the scanner 30 may start reading the document in accordance with the instruction to start the reading from the control unit 11.

The control unit 11 (data acquisition unit 20) acquires the document image data transmitted from the scanner 30 as described above via the communication IF14 (step S200). Instead of directly acquiring (receiving) the document image data from the scanner 30, the data acquisition unit 20 may acquire the document image data from the storage unit (for example, the storage unit 15) as a transfer destination to which the document image data is transferred from the scanner 30.

The control unit 11 (file save support unit 21) recognizes a character string included in the document image data by performing character recognition (OCR: Optical Character Recognition/Reader) on the document image data acquired in step S200 (step S210). In this case, the character string and the recognizable objects included in the document image data are converted into character data (text data). Since the character recognition processing is a well-known technique, further description will be omitted.

In step S220, the file save support unit 21 searches for a pre-registered specific character string from a character string (hereinafter, character strings in data) included in the document image data recognized in step S210. The specific character string is a character string registered in a table T. The table T is stored in a storage unit (for example, the storage unit 15) in the image processing apparatus 10. However, the table T is stored in an external server, and the image processing apparatus 10 may refer to the table T appropriately by accessing the server through the network.

The specific character string is basically a word indicating the type of the document (usage and purpose of the manuscript document). For example, in the table T, words that are supposed to be included in a document in a document, such as "invoice", "bill", "contract", and the like and briefly express the type of the document are registered in advance as specific character strings. Further, in the table T, a character string that the control unit 11 that executes the program A has accepted as an input of a file name in the past may be registered as a type of specific character string. In other words, the control unit 11 that executes the program A may increase the number of registered specific character strings in the table T by registering the words (for example, the name of the shop, facility or company that issued a document) included in the file names input by the user in the file name input field by operating the operation receiving unit 13 and the like in the table T.

In step S230, the file save support unit 21 extracts date information from the character strings in the data. In other words, the file save support unit 21 extracts a predetermined number of digits representing a date and a character string including such a number, a slash "/", and a "year", a "month", a "day" of a kanji as date information. In FIG. 7, the extraction of the date information (step S230) is executed after the search of the specific character string (step S220), but the processing order of these steps S220 and S230 may be reversed or may be performed in parallel depending on the processing capability of the control unit 11. In S230, the folder name may be managed as only the type of the document, the description thereof may be omitted.

In step S240, the file save support unit 21 generates a folder name to be attached when saving the document image data acquired in step S200, using the results of steps S220 and S230. In this case, the file save support unit 21 generates a folder name including the specific character string detected from the character strings in the data in the search in step S220 and the date information extracted from the character strings in the data in step S230. Specifically, the file save support unit 21 uses a specific character string as a prefix, date information as a suffix, and connects these specific character strings and date information with an underscore "_", a hyphen "-", or the like to generate a file name. For example, in a case where "invoice" is detected as a specific character string from the character strings in the data in the search in step S220 and "Sep. 30, 2017" is extracted as date information in step S230, it is possible to generate a folder name such as "invoice Sep. 30, 2017".

Figure 8:
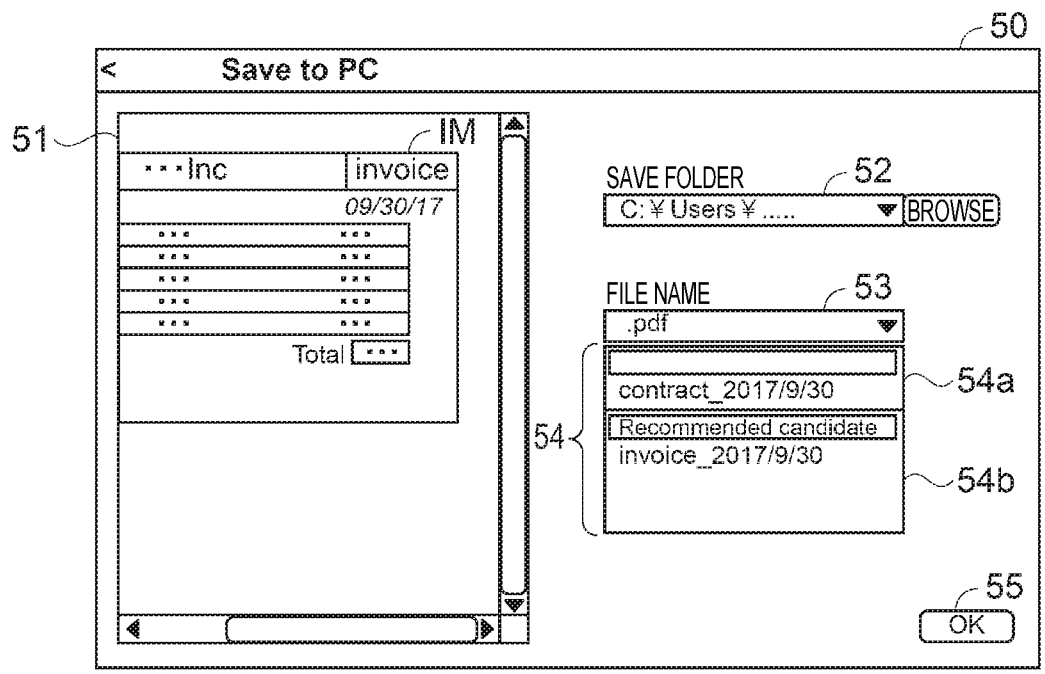
FIG. 8 is a diagram showing an example of a folder name candidate setting screen according to a modification example.

In step S250, the control unit 11 (display control unit 22) displays the file name generated in step S240 on the display unit 12. FIG. 8 shows an example of the folder setting screen 50 to be displayed by the display control unit 22 on the display unit 12 in step S250. The folder setting screen 50 includes a document image display field 51, a folder setting field 52, a folder name input field 53, and the like. In the document image display field 51, an image IM based on the document image data acquired in step S200, that is, a document is displayed, and the user may visually recognize the document read by the scanner 30 through the document image display field 51.

The folder setting field 52 is an input field for setting a folder (for example, a folder in the storage unit 15) as a save destination of the document image data acquired in step S200. The user may set an arbitrary folder (an existing folder or a newly created folder) in the folder setting field 52 by operating the operation receiving unit 13 or the like.

The folder name input field 53 is an input field for setting a folder name to be attached to the document image data acquired in step S200. The user may set a folder name by inputting an arbitrary folder name into the folder name input field 53 by operating the operation receiving unit 13 or the like. However, in the embodiment, as illustrated in FIG. 8, the display control unit 22 displays the folder name candidate field 54 in the vicinity of the folder name input field 53. The folder name candidate field 54 includes a first field 54*a* for displaying the folder name based on the setting history of the folder names and a second field 54*b* for displaying the folder name generated in step S240. In the first field 54*a*, for example, the folder name (actually adopted in file saving) set in the folder name input field 53 in the past (latest) is displayed. In the second field 54*b*, the folder name generated in step S240, for example, "invoice Sep. 30, 2017" as described above is displayed.

The display control unit 22 sets the folder name selected from the folder name candidate field 54 in the folder name input field 53. In other words, the user may set the selected folder name in the folder name input field 53 merely by selecting a file name from the folder name candidate field 54 (clicking or tapping the file name displayed in the folder name candidate field 54).

The control unit 11 determines the folder name according to the input by the user on the folder setting screen 50 (step S260). More specifically, when the control unit 11 detects an operation on a predetermined button (OK button 55 in the example of FIG. 8) on the folder setting screen 50, the folder name set in the folder name input field 53 at that point in time is determined as the folder name for saving the document image data acquired in step S200. That is, the user may attach the file name to the scan data (document image data) of the document read by the scanner 30 merely by visually recognizing the folder name automatically generated in step S240 in the folder name candidate field 54 (second field 54*b*), and selecting and approving the folder name (pressing the OK button 55).

Then, the control unit 11 creates a folder to which the folder name determined in step S260 is attached (step S270), for the document image data acquired in step S200. This completes the flowchart of FIG. 7.

As described above, in the present modification example, when an existing folder in which at least part of the folder name matches the character strings in the data may not be found, since a folder name including a character string representing the type of the read document may be presented as a candidate for the folder name for saving a file and newly created, it is possible to easily set an appropriate folder.

Modification Example 3

As another modification, the storage unit 15 may store a database of issuers (company names or shop names) of documents and present character strings matching the company names stored in the database as candidates of folder names.

For example, a user creates a company name "LLL" under the folder "invoice" and manages the name under the folder system "C:\Users\ . . . \Invoice\LLL". However, another user does not necessarily give the folder name under the same rule, and there is a possibility that the system of folders may not be unified.

In the modification example, under the character string representing the type of the document read by the character recognition processing, a folder name combining a character string matching the issuer of the document registered in the database stored in the storage unit 15 is presented as a candidate for a folder name for saving a file.

As described above, in the modification example, it is possible to unify the structure of folders, particularly when creating new folders by presenting folder names based on a specific rule. Therefore, when searching for a file saved later, the user may easily search for a folder in which a desired file is saved.

This application claims priority to Japanese Application Nos. 2017-250716, filed 27 Dec. 2017 and 2018-127402, filed Jul. 4, 2018, the entirety of which are incorporated by reference herein.

What is claimed is:

1. An image processing apparatus comprising:
a processor that:
   acquires document image data generated by reading a document; and
   recognizes a character string included in the document image data by character recognition; and
a storage that saves the document image data, wherein the processor
   sets a folder name of each folder of one or more folders at a same level as a folder which is a save destination of previous data, as a comparison target with the character string included in the document image data, wherein the previous data corresponds to data saved last time in latest past; and
   compares the folder name of each folder of the one or more folders in the storage with the character string included in the document image data to select a folder from the one or more folders as a folder of a save destination of the document image data, wherein at least a part of a folder name of the selected folder matches the character string included in the document image data.

2. The image processing apparatus according to claim 1, wherein the processor includes a folder name of a folder one level higher than the folder as the save destination of the previous data or a folder name of a folder one level lower than the folder, as the comparison target with the character string included in the document image data.

3. The image processing apparatus according to claim 1, wherein the processor preferentially selects a folder in which at least the part of the folder name matches the character string included in the document image data and a plurality of character strings included in a path indicating a route to a folder in the storage match the character string included in the document image data, as the folder of the save destination.

4. The image processing apparatus according to claim 1, wherein the processor searches for a specific character string registered beforehand from the character string and selects a file name including the specific character string detected by the search, as the folder name.

5. The image processing apparatus according to claim 4, wherein the processor compares the character string included in the document image data with a database of an issuer of the document stored in the storage and selects a character string included in the document image data that matches the issuer of the document included in the database, as at least a part of a name of the folder of the save destination.

6. An image processing apparatus comprising:
a processor that:
   acquires document image data generated by reading a document; and
   recognizes a character string included in the document image data by character recognition; and
a storage that stores the document image data, wherein the processor
   sets a file name of each file of one or more files at a same level as a file which is a save destination of previous data, as a comparison target with the character string included in the document image data, wherein the previous data corresponds to data saved last time in latest past; and
   compares the file name of each file of the one or more files saved in the storage with the character string included in the document image data to select a file name from one or more file names associated with the one or more files as a file name of a save destination of the document image data, wherein at least a part of the selected file name matches the character string included in the document image data.

7. A non-transitory computer-readable medium having stored thereon computer-executable instructions, that when executed by a processor, cause the processor to execute operations, the operations comprising:
   recognizing a character string included in document image data by character recognition;
   setting a folder name of each folder of one or more folders at a same level as a folder which is a save destination of previous data, as a comparison target with the character string included in the document image data, wherein the previous data corresponds to data saved last time in latest past; and
   comparing the folder name of each folder of the one or more folders in a storage with the character string included in the document image data to select a folder from the one or more folders as a folder of a save destination of the document image data, wherein at least a part of a folder name of the selected folder matches the character string included in the document image data.

8. A non-transitory computer-readable computer medium having stored thereon computer-executable instructions, that when executed by a processor, cause the processor to execute operations, the operations comprising:
   recognizing a character string included in document image data by character recognition;
   setting a file name of each file of one or more files at a same level as a file which is a save destination of previous data, as a comparison target with the character string included in the document image data, wherein the previous data corresponds to data saved last time in latest past; and
   comparing the file name of each file of the one or more files in a storage with the character string included in the document image data to select a file name from one or more file names associated with the one or more files as a file name of a save destination of the document image data, wherein at least a part of the selected file name matches the character string included in the document image data.

* * * * *